United States Patent
Johnson et al.

(10) Patent No.: US 6,512,875 B1
(45) Date of Patent: Jan. 28, 2003

(54) OPTICAL CABLE TROUGHS, FITTINGS, AND COUPLINGS

(75) Inventors: Brian L. Johnson, Maple Grove, MN (US); Mathew D. Ferris, Chaska, MN (US); Joel T. Fisher, South St. Paul, MN (US); Wayne Johnson, Rosemount, MN (US); Thomas W. Kampf, Minnetonka, MN (US); Alex Watts, Minnetonka, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/680,866

(22) Filed: Oct. 6, 2000

(51) Int. Cl.[7] .................................................. G02B 6/10
(52) U.S. Cl. .................................... 385/134; 248/228.4
(58) Field of Search ................................ 385/100, 134, 385/135, 136, 137; 248/49, 58, 68.1, 228.4, 229.23, 231.51

(56) References Cited

U.S. PATENT DOCUMENTS

| | | |
|---|---|---|
| 2,316,166 A | 4/1943 | Huguelet |
| 3,338,599 A | 8/1967 | Hallman |
| 4,040,449 A | 8/1977 | Butler et al. |
| 5,067,678 A | 11/1991 | Henneberger et al. |
| 5,160,811 A | 11/1992 | Ritzmann |
| 5,161,580 A | 11/1992 | Klug |
| 5,240,209 A | 8/1993 | Kutsch |
| 5,271,585 A | 12/1993 | Zetena, Jr. |
| 5,316,243 A | 5/1994 | Henneberger |
| 5,316,244 A | 5/1994 | Zetena, Jr. |
| 5,335,349 A | 8/1994 | Kutsch, Jr. |
| 5,503,354 A | 4/1996 | Lohf et al. |
| 5,752,781 A | 5/1998 | Haataja et al. |
| 5,902,961 A * | 5/1999 | Viklund et al. .............. 174/100 |
| 5,923,753 A | 7/1999 | Haataja et al. |
| 5,937,131 A | 8/1999 | Haataja et al. |
| 5,995,699 A | 11/1999 | Vargas et al. |
| 6,037,538 A | 3/2000 | Brooks |
| 6,044,194 A * | 3/2000 | Meyerhoefer ................ 385/134 |
| 6,076,779 A | 6/2000 | Johnson |
| 6,263,144 B1 * | 7/2001 | Daoud .......................... 385/135 |
| 6,271,476 B1 * | 8/2001 | Bobowick et al. ........... 174/135 |
| 6,298,191 B1 * | 10/2001 | Daoud .......................... 385/137 |
| 6,304,707 B1 * | 10/2001 | Daems et al. ................ 385/135 |

FOREIGN PATENT DOCUMENTS

WO    Wo 87/00358    1/1987

OTHER PUBLICATIONS

ADC Telecommunications brochure entitled "FiberGuide® Fiber Management Systems," 33 pages, dated Oct., 1995.
Warren & Brown & Staff brochure pages entitled "light-paths," Issue 2, 11 pages, dated 1995, (No month).
ADC Telecommunications brochure entitled "Fiber Guide™ Fiber Management System," 6 pages, dated Jun., 1989.
ADC Telecommunications brochure entitled "ADC Fiber-Guide® System Express Exit™ 2×2," 2 pages, dated May 1999.
ADC Telecommunications brochure entitled "FiberGuide® Fiber Management Systems," 37 pages, dated Jun. 1998.

* cited by examiner

Primary Examiner—Tulsidas Patel
Assistant Examiner—Thanh-Tam Le
(74) Attorney, Agent, or Firm—Merchant & Gould P.C.

(57) ABSTRACT

A coupling and assembly for a cable routing system, the system having trough members with flanged ends. The coupling includes a U-shaped rib having a rail on an exterior surface of the rib. The coupling also includes a pivoting clamp pivotally coupled to the rib near a first end of the clamp so that the clamp may be pivoted between an open and a closed position. The clamp has a contoured clamping surface which is contoured to retain the flanged ends of adjacent troughs against the rail and the external surface of the rib when the pivoting clamp is in the closed position. The clamp also includes retention means which cooperate with retention means on the rib to releasably retain the clamp in its closed position.

7 Claims, 7 Drawing Sheets

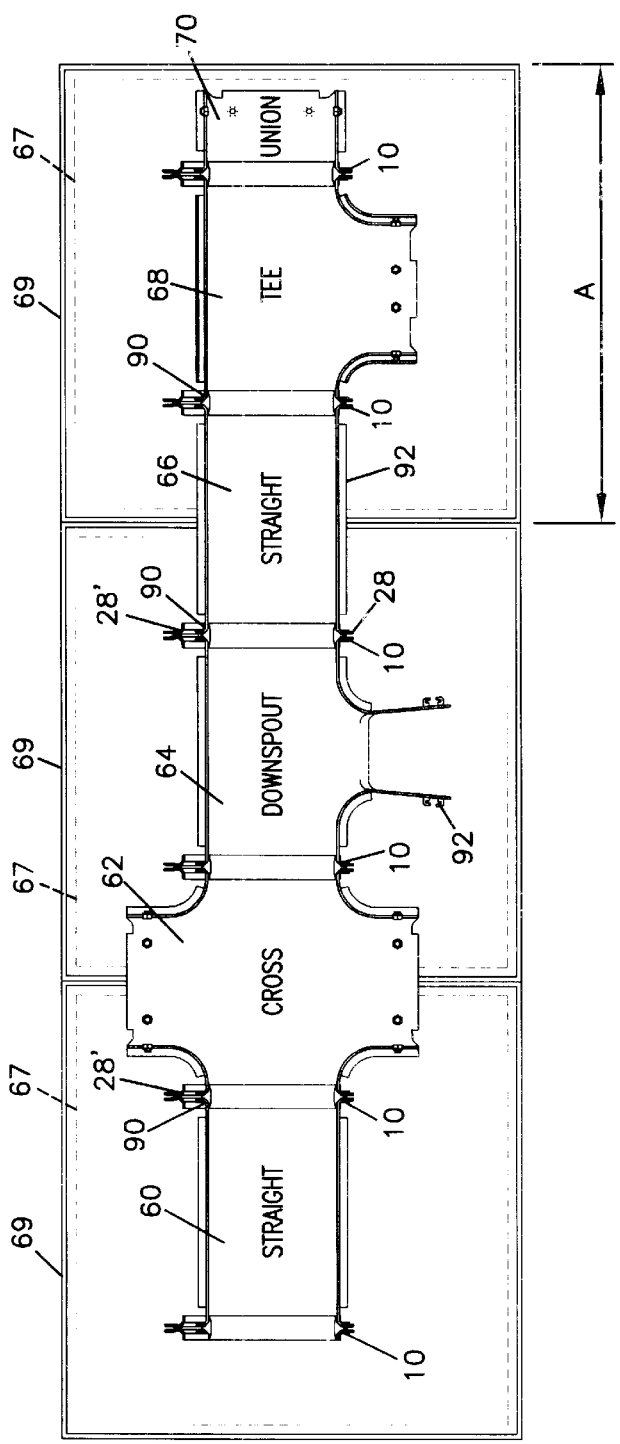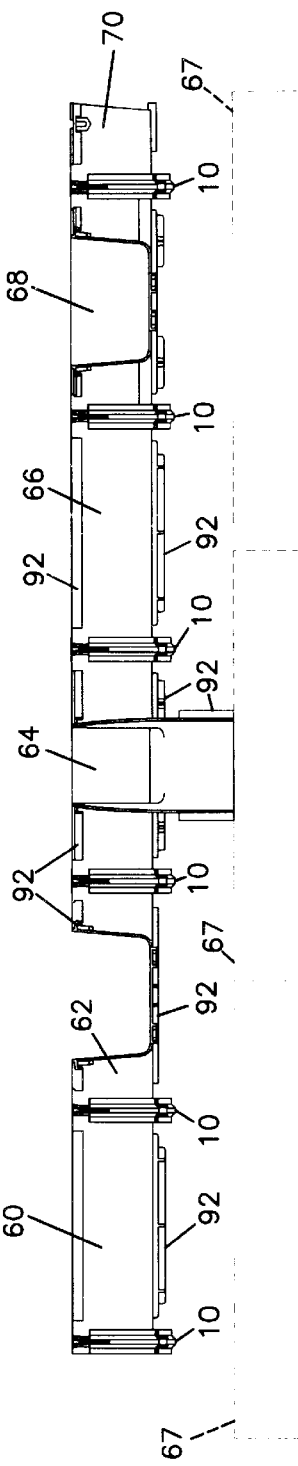
FIG.5
FIG.6

OPTICAL CABLE TROUGHS, FITTINGS, AND COUPLINGS

FIELD OF THE INVENTION

This application pertains to a system for the management and routing of optical fiber cables and other cables. More particularly, this application pertains to a coupling for joining trough members such as troughs and fittings.

BACKGROUND OF THE INVENTION

In the telecommunications industry, the use of optical fibers for signal transmissions is accelerating. With the increased utilization of optical fiber systems, optical fiber cable management requires industry attention.

One area of optical fiber management that is necessary is the routing of optical fibers from one piece of equipment to another. For example, in a telecommunications facility, optical fiber cables may be routed between fiber distribution equipment and optical line terminating equipment. In buildings and other structures which carry such equipment, the cable routing can take place in concealed ceiling areas or in any other manner to route cables from one location to another.

When routing optical fibers, it is desirable that a routing system will be readily modifiable and adaptable to changes in equipment needs. Accordingly, such routing systems include a plurality of trough members such as troughs and couplings for modifying a cable routing path. The trough system members are joined together by couplings. U.S. Pat. No. 5,067,678 to Henneberger et al date Nov. 26, 1991 teaches a cable routing system that discloses a plurality of troughs and fittings. The '678 patent further discloses a coupling (element 250 in FIG. 1 of the '678 patent) for joining trough members and fittings. With best reference to FIGS. 6–7 of the '678 patent, a plurality of hardware is disclosed for joining the trough members. The hardware can be cumbersome. The present invention is directed towards an improved method for joining trough members and fittings.

A preferred coupling is easily installed. Furthermore, where the cable routing system is used in combination with large arrays of equally spaced equipment units, it is important for ease of installation that the couplings used do not misalign the routing system components with their respective equipment units. This typically happens where a large number of routing trough members are coupled together in a long line. If the space introduced by each coupling between trough members is not minimized, the couplings will introduce a shift in the location of the trough members relative to the equipment units with which they are to operate. Therefore, smaller couplings which introduce less space between trough members are preferred.

U.S. Pat. No. 5,752,781 to Haataja et al discloses an additional example of a coupling for troughs and fittings. The '781 patent shows a coupling which receives opposed ends of two troughs or fittings. Fasteners attach the coupling to the troughs or fittings. In some applications the size of the coupling in the '781 patent is too long when combined with other desired troughs and fittings. One such situation may occur where the user is attempting to maintain a predetermined spacing of components in a routing system over bays spaced every 600 millimeters or 800 millimeters. Further improvements are desired for cable routing systems.

SUMMARY OF THE INVENTION

The invention relates to a quick-connect coupling, system and method for a cable routing system including trough members to be joined at flanged ends. The coupling includes a U-shaped rib and a pivoting clamp. The U-shaped rib has a rail along an external side of the rib. The rib also includes retention arrangement, such as a retention bracket, extending from the external side of the rib. The pivoting clamp has two ends. The first end is pivotally coupled to the rib. The second end includes retaining means, such as retention arms, which may be releasably retained by the retention means of the U-shaped rib when the pivoting clamp is pivoted to a closed position. The clamp has a clamping surface contoured to hold two flanged ends of adjacent trough members or other fittings against the rail and the external side of the rib when the pivoting clamp is in the closed position.

BRIEF DESCRIPTION OF THE DRAWINGS

FIG. 5 is a top view of a cable routing system according to the present invention incorporating quick-connect flanged trough members and quick-connect couplings.

FIG. 6 is a side view of the cable routing system of FIG. 5.

DETAILED DESCRIPTION OF THE PREFERRED EMBODIMENT

Figure 1:
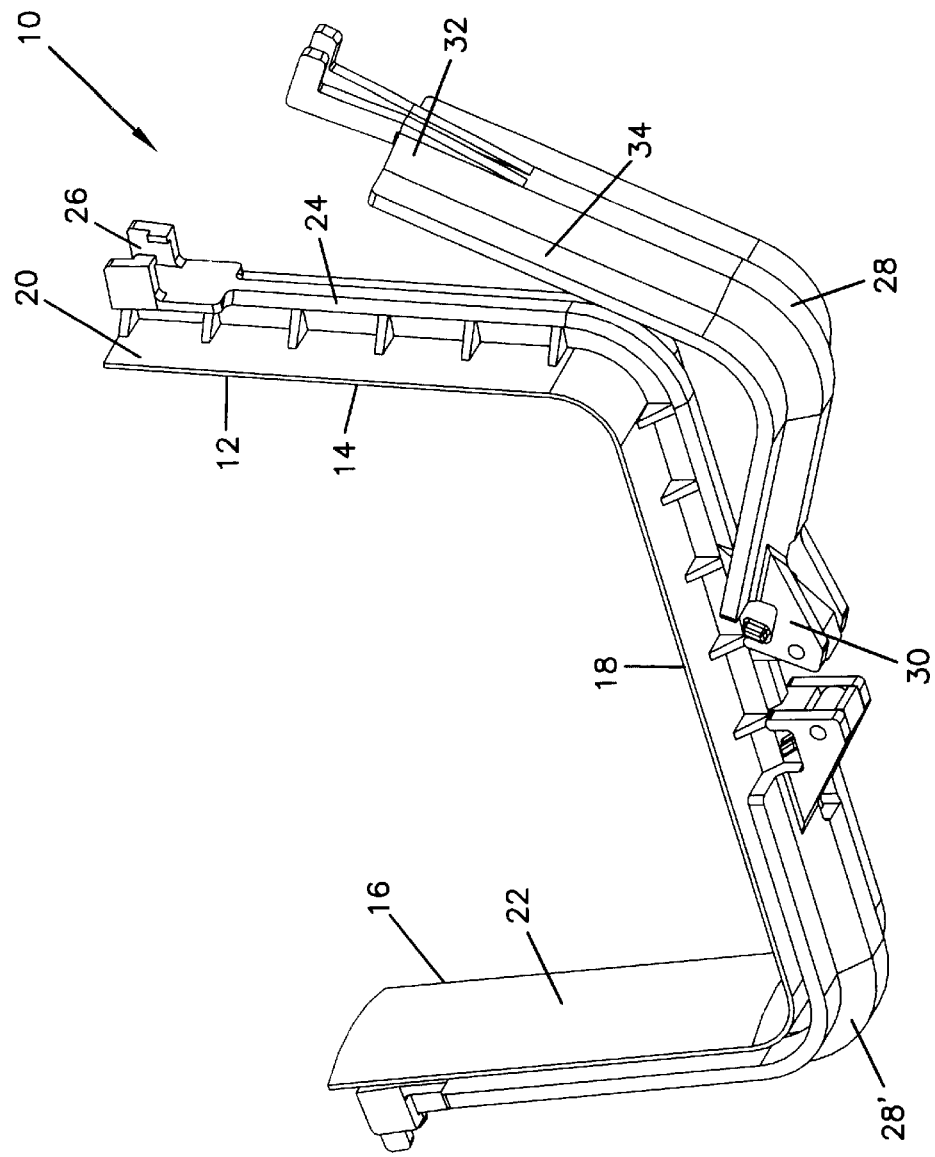
FIG. 1 is a perspective view of an embodiment of a coupling according to the present invention.
Figure 2:
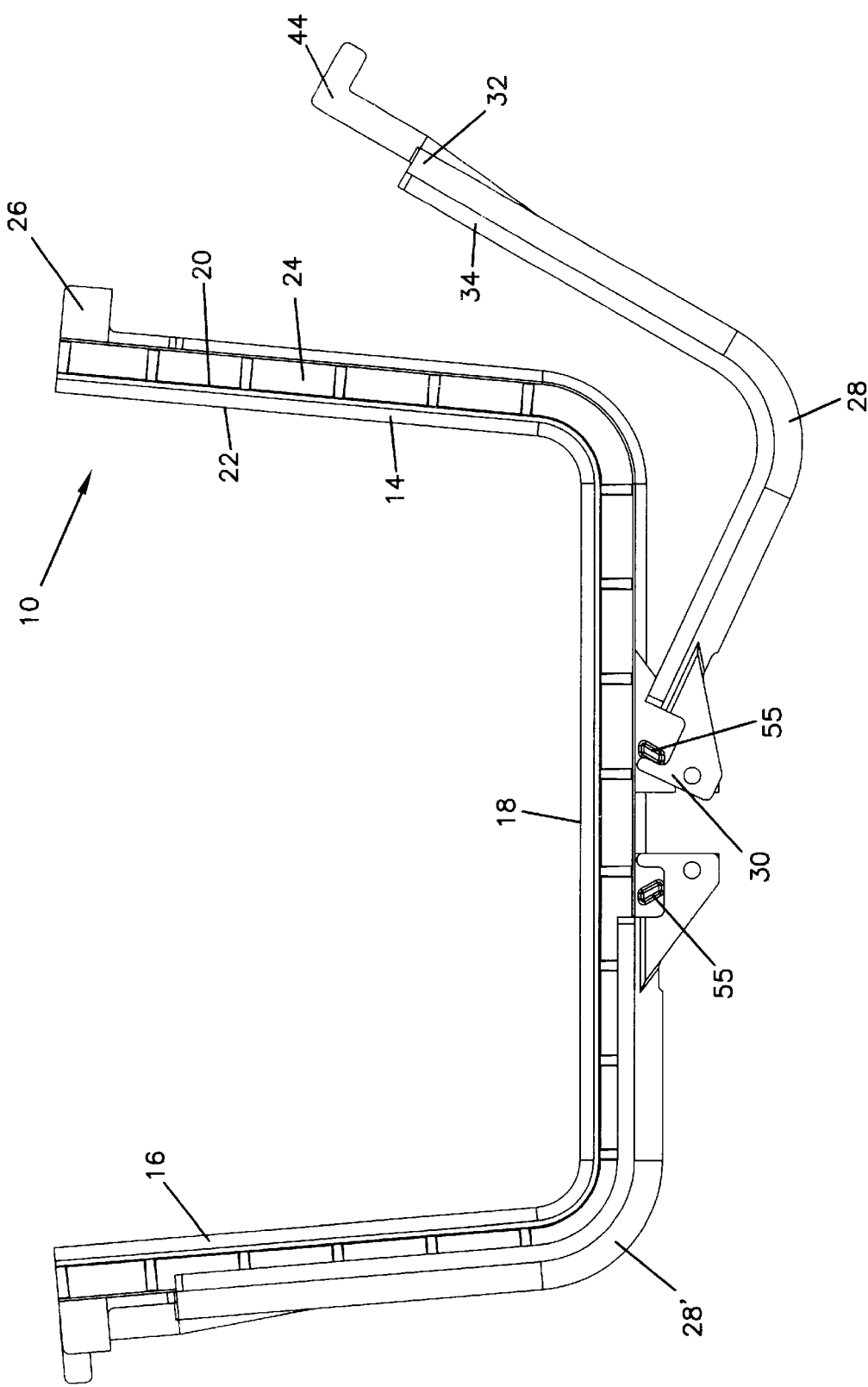
FIG. 2 is a front view of the coupling of FIG. 1.

Referring now to FIGS. 1–4, a quick-connect coupling 10 is shown for use in coupling flanged cable trough members. The coupling 10 is designed for quick and easy-coupling of two cable troughs or other cable routing members without using special tools, screws, or other cumbersome and time consuming hardware.

The coupling 10 includes a U-shaped rib 12 having two side members 14 and 16 connected by a bottom member 18. The rib 12 has an external surface 20 and an internal surface 22. The rib 12 includes a rail 24 which extends from the external surface 20 of the rib 12.

Figure 3:
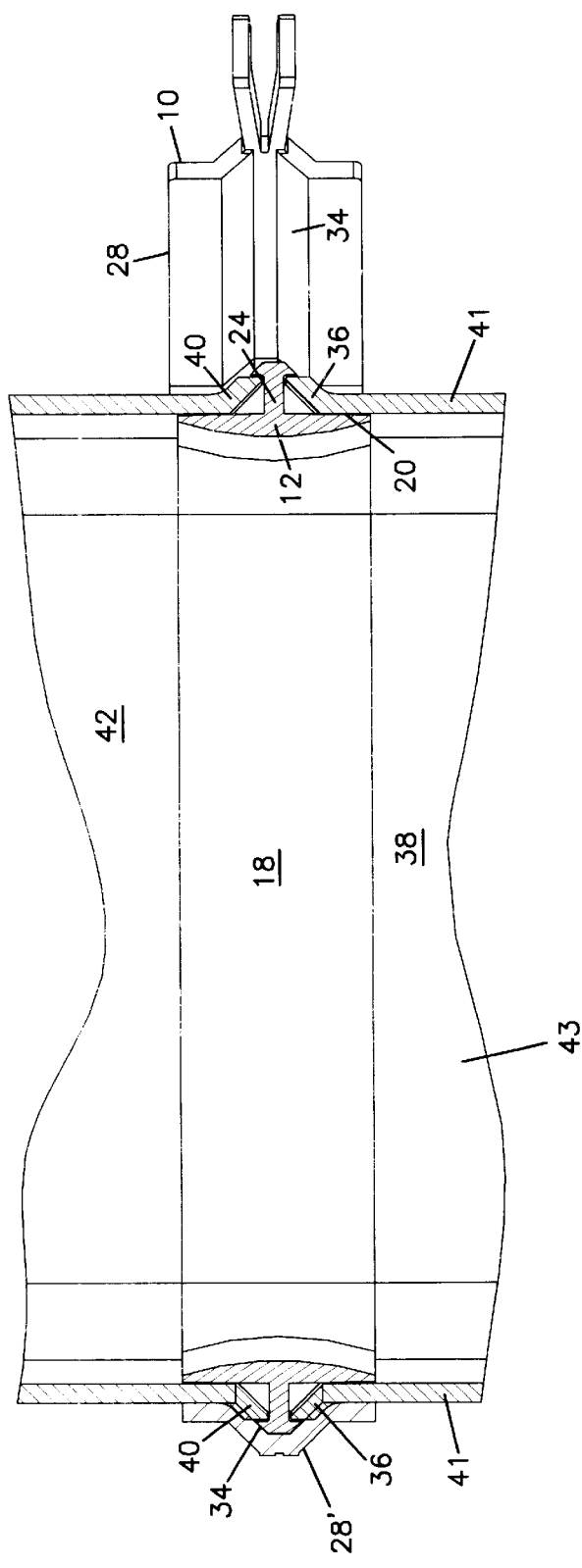
FIG. 3 is a cross sectional view of a coupling according to the present invention coupling two trough members.
Figure 4:
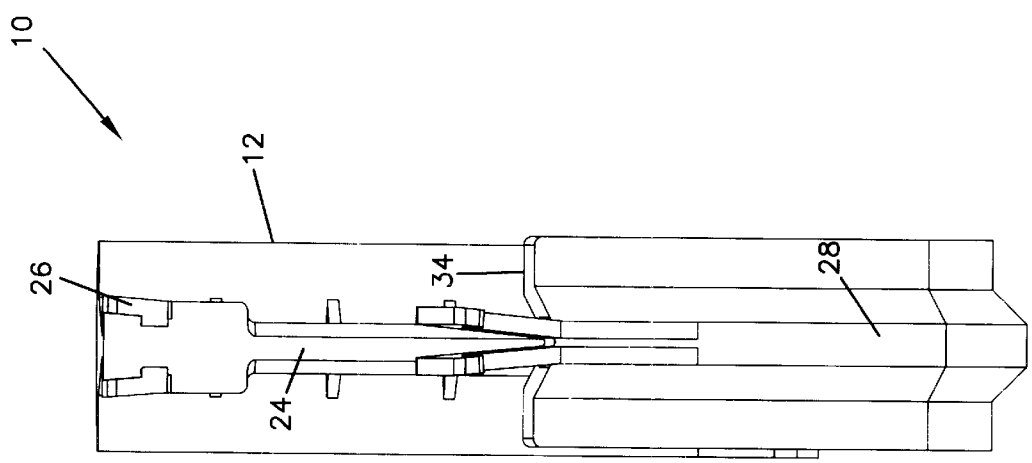
FIG. 4 is a side view of the coupling of FIG. 1.

The coupling 10 secures two adjacent trough members by means of a pivoting clamp 28. The pivoting clamp 28 secures the ends of adjacent trough members by gripping the trough ends between the clamp and the external surface 20 of the rib 12. The pivoting clamp 28 is pivotally coupled to the rib 12 or the rail 24 of the rib 12 at a point near a first end 30 of the clamp 28. The clamp 28 pivots between an open position (as shown by clamp 28 in the figures) and a closed position (as shown by clamp 28' in the figures). As best seen in FIG. 3, the clamp 28 includes a contoured clamping surface 34 which acts to hold flanged ends 36 and 40 of adjacent trough members 38 and 42 against the rail 24 and external surface 20 of the rib 12. Therefore, two flanged ends of trough members may be coupled quickly and easily by placing the flanged ends 36 and 40 adjacent the rail 24 and then closing the clamp 28 to bind the ends 36 and 40 to the rib 12 and rail 24 of the coupling 10. Internal surface 22 covers the joint between trough members 38 and 42 for cable protection. A stop 55 limits the amount of pivoting of clamp 28.

Figure 7:
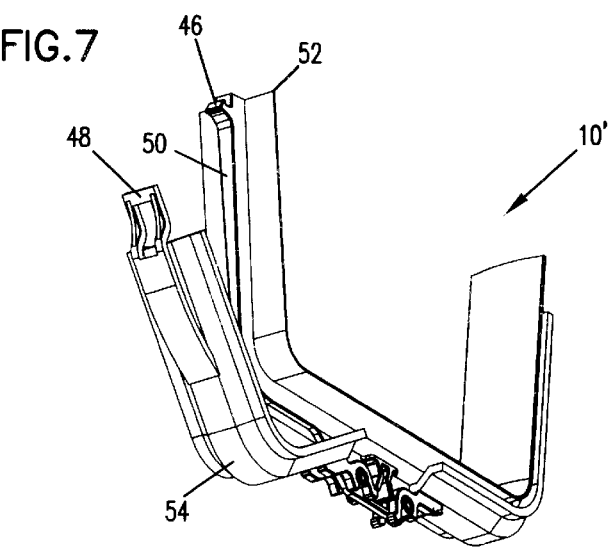
FIG. 7 is a perspective view of an alternative embodiment of a coupling according to the present invention.
Figure 8:
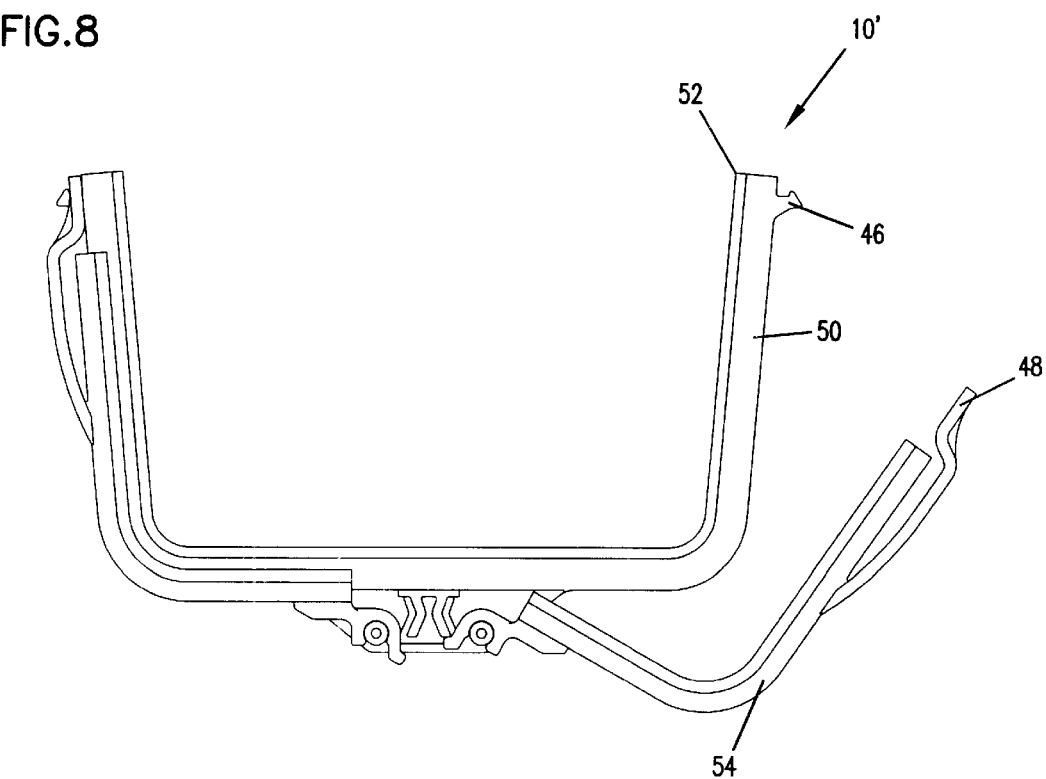
FIG. 8 is a front view of the coupling of FIG. 7.
Figure 9:
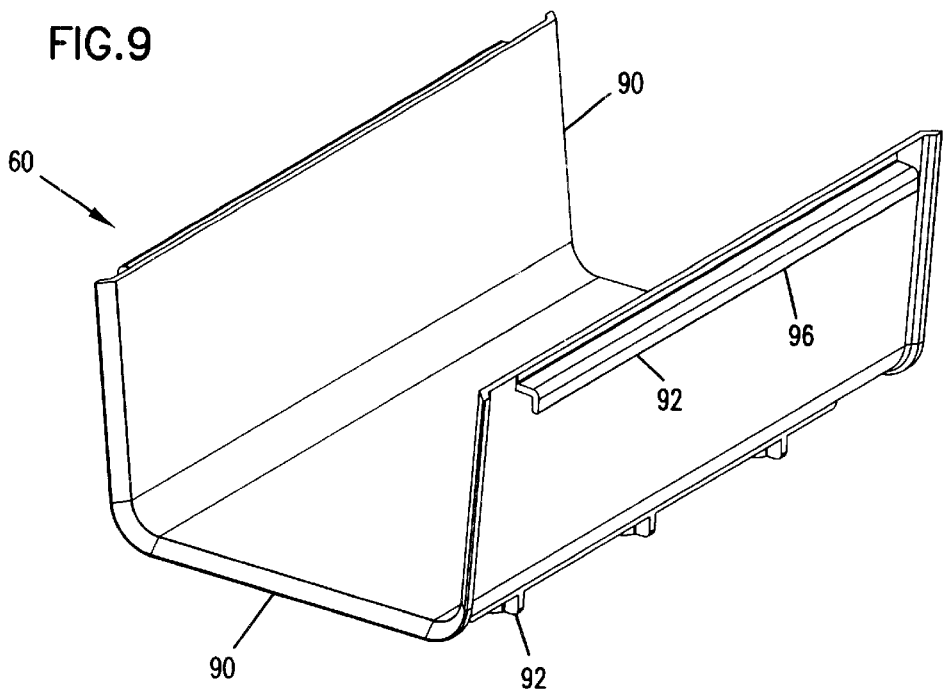
FIGS. 9 and 10 are perspective views of one preferred embodiment of a lateral or straight trough member.
Figure 10:
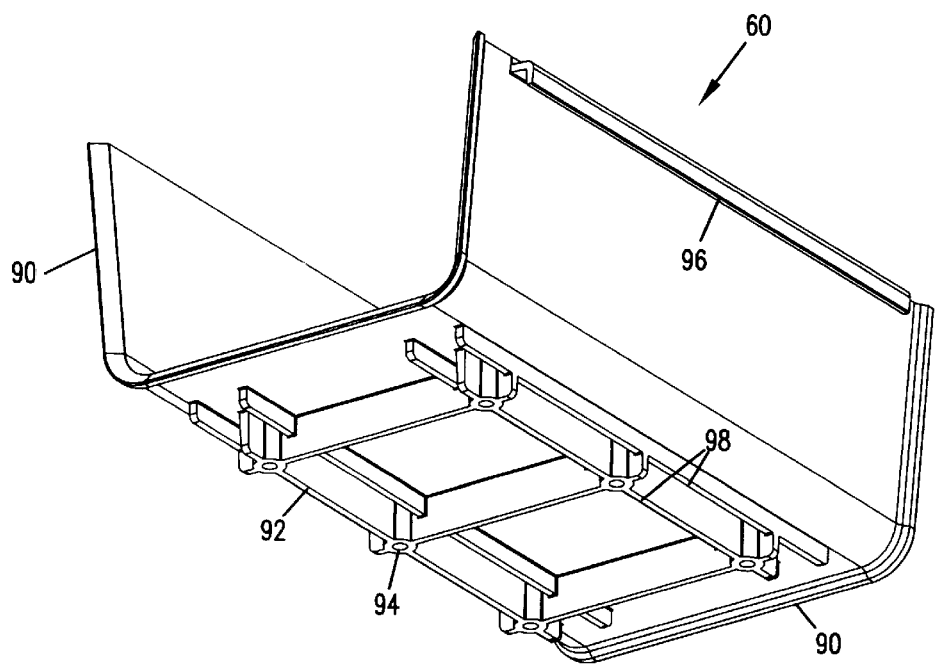

Near a second end 32 of the clamp 28 extend retention arms 32. The retention arms 32 are releasably retained in retention brackets 26 on the coupling rib 12. The retention brackets 26 with the retention arms 32 hold the clamp 28 in its closed position. The clamp 28 may be quickly opened by releasing the retention arms 32 from the brackets 26. In this way, an assembly of trough members such as the one shown in FIGS. 5 and 6, may be quickly assembled, disassembled or rearranged. It is to be understood that the retention arms 32 and the retention brackets 26 could be easily switched so that the retention arms 32 are disposed on the rib 12 and the brackets 26 are on the clamp 28. Alternatively, any of various retention arrangements could be employed to hold the clamp 28 in its closed position relative to the rib 12. Such means may include clips, hooks, interlocking tabs or notches, catches, clasps or other fasteners. One such alternative is shown in FIGS. 7 and 8. The alternative embodiment 10' employs a hook and eye retention arrangement. A hook 46 extends from the rail 50 of the rib 52. The hook 46 retains the pivoting clamp 54 in a closed position by catching an eye tab 48 which extends from the clamp 54.

In the preferred embodiment of FIGS. 1–6, the coupling includes two clamps 28 and 28', and each clamp 28 and 28' is pivotally coupled to the rail 24 along the bottom member 18 of the rib 12. Clamps 28, 28' could be hinged adjacent the tops of the side members 14, 16, and each could be releasably retained at the center of the bottom member 18. A single U-shaped clamp could be used, hinged at the top end of one side member of the coupling, and releasably retained at the top end of the opposite side member.

As shown in FIG. 3, the trough members 38 and 42 to be coupled each have two generally planar side surfaces 41 and a generally planar bottom surface 43. Therefore, the trough members are U-shaped like the rib 12 of the coupling 10. The ends 36 and 40 of the trough members 38 and 42 are flanged in that they flare outward at their most extreme tips. The flanged ends 38 and 42 provide a surface for the contoured clamping surface 34 of the clamp 28 to abut in order to resist a separating force between the trough members 38 and 42. Although the drawings depict a design where the flanged ends 38 and 42 are flared at a 45 degree angle from the sides 41 of the trough members 38 and 42, it is to be understood that the ends 36 and 40 could be flared at any of a number of angles, including 90 or more degrees, as long as the clamping surface 34 of the clamp 28 is suitably contoured to abut the flanged ends 36 and 40 to resist a separating force between the trough members 38 and 42.

FIGS. 5 and 6 show a quick-connect assembly of flanged trough members and fittings connected by couplings according to the present invention. As shown, a straight cable trough 60 is coupled to a crossing cable trough 62 which is coupled to a downspout cable trough 64 which is coupled to another straight cable trough 66 which is coupled to a tee cable trough 68 which is coupled to a union cable trough 70. Each of the trough members has a flanged end 90 as noted above for trough members 38 and 42 allowing the trough member to be coupled to an adjacent trough member by means of a coupling 10 according to the present invention. Each coupling 10 has one clamp 28' in the closed position and one clamp 28 in the open position. Cable trough members typically include exterior structure 92 such as holes 94, rails 96, or lips 98 or other junction interface structure on the trough for fastening to other trough fittings or for mounting to bracket support structure for hanging the system from the ceiling or supporting it above the bays.

Use of coupling 10 allows for the appropriate lengths of straight cable troughs 60, crossing cable troughs 62, or downspout cable troughs 64 or other routing device over each bay or other equipment. In one example system shown in FIG. 5, each bay 67 is centered over a tile 69. Each tile 69 is generally square with sides of 600 or 800 millimeters (distance A in the FIGS.) as is common in the telecommunications rooms in buildings outside the U.S.

Coupling 10 which captures end flanges on the troughs and fittings allows for more room for the troughs and other fittings between couplings. Such a design reduces the space constraints caused by some prior couplings that relied on fasteners or snaps to attach the coupling to the trough or other fittings. Coupling 10 may also be quicker and easier to install since no tools or fasteners are used in the preferred embodiment.

A further modification anticipated for coupling 10 is to provide U-shaped rib 12 and clamp 28 as separate pieces clamped or mounted together in position around the flared ends of trough members. Such clamping could occur with snaps or separate fasteners if desired.

Having described the present invention in its preferred embodiments, modifications and equivalents may occur to one skilled in the art. It is intended that such modifications and equivalents shall be included within the scope of the claims which are appended hereto.

What is claimed is:

1. A coupling for a cable trough system including trough members to be coupled at flanged ends, the trough members having first and second generally vertical side walls joined by a generally horizontal bottom wall; the coupling comprising:
   a U-shaped rib having two side members connected by a bottom member, the rib having an external surface and an internal surface, the rib having a rail on its external surface, the rib also having first retention arrangement extending from a side member;
   a pivoting clamp having two ends, the clamp being pivotally coupled at its first end to the rib, the clamp at its second end having second retention arrangement to be releasably received by the first retention arrangement of the rib when the pivoting clamp is pivoted to a closed position, the clamp having a contoured clamping surface, the clamping surface being contoured to hold two flanged ends of adjacent trough members against the rail and the external surface of the rib when the pivoting clamp is in the closed position.

2. The coupling of claim 1 wherein the pivoting clamp is pivotally coupled at its first end to the bottom member of the U-shaped rib.

3. The coupling of claim 2 further comprising a second pivoting clamp having two ends, the clamp being pivotally coupled at its first end to the bottom member of the U-shaped rib, the second clamp at its second end having third retention arrangement to be releasably received by a fourth retention arrangement of the rib when the pivoting clamp is pivoted to a closed position, the clamp having a contoured clamping surface, the clamping surface being contoured to hold two flanged ends of adjacent trough members against the rail and the external surface of the rib when the second pivoting clamp is in the closed position.

4. A quick-connect cable routing trough comprising:
   a U-shaped trough section terminating in a flanged end;
   the U-shaped trough section including two planar side members connected by a planar bottom member;
   the side member and the bottom member having interior and exterior surfaces, the flanged end being defined by a bend of the side members and the bottom member toward their exterior surfaces;

an exterior surface defining a non-uniform cross-section having trough mounting structure to mount the trough section to other system components.

5. The trough of claim 4, wherein the trough mounting structure includes two rails defining a plurality of spaced apart holes.

6. A quick-connect cable routing system comprising:
   a first cable routing trough having a U-shaped trough section terminating in a flanged end;
   a second cable routing trough having a U-shaped trough section terminating in a flanged end; and
   a coupling receiving the flanged ends of the first and second cable routing troughs, the coupling including:
      a U-shaped rib having two side members connected by a bottom member, the rib having an external surface and an internal surface, the rib having a rail on its external surface, the rib also having first retention arrangement extending from a side member; and
      a pivoting clamp having two ends, the clamp being pivotally coupled at its first end to the rib, the clamp at its second end having second retention arrangement to be releasably received by the first retention arrangement of the rib when the pivoting clamp is pivoted to a closed position, the clamp having a contoured clamping surface, the clamping surface being contoured to retain the flanged ends of the first and second cable routing troughs against the rail and the external surface of the rib when the pivoting clamp is in the closed position.

7. A method of assembling a cable routing system comprising the steps of:
   providing two trough members with U-shaped flared ends;
   positioning a coupling around the U-shaped flared ends wherein a first portion of the coupling is inside each trough member and a second portion is outside each trough member;
   clamping the coupling around the U-shaped flared ends to prevent separation or misalignment of the trough members.

\* \* \* \* \*